Figure 1:
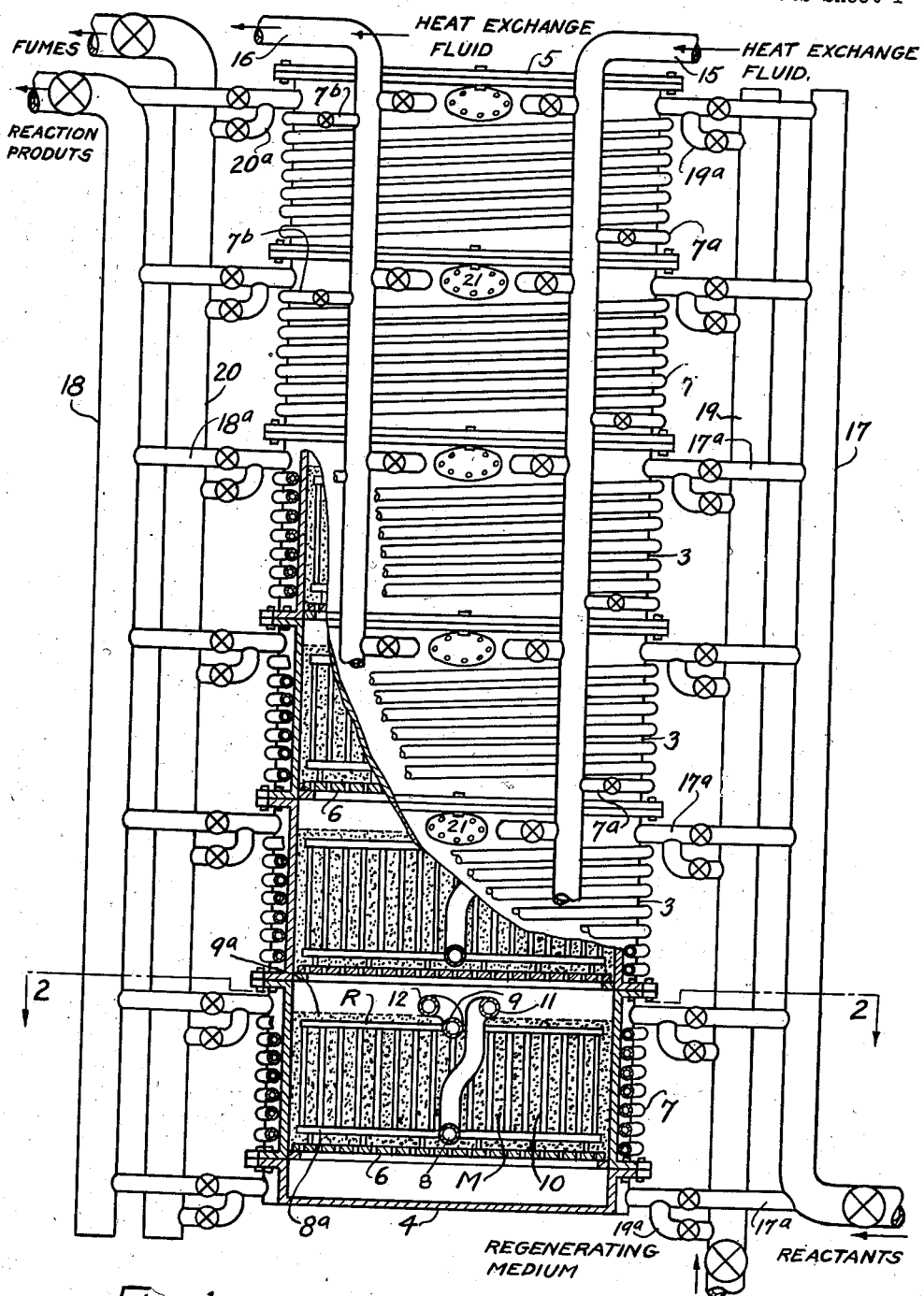

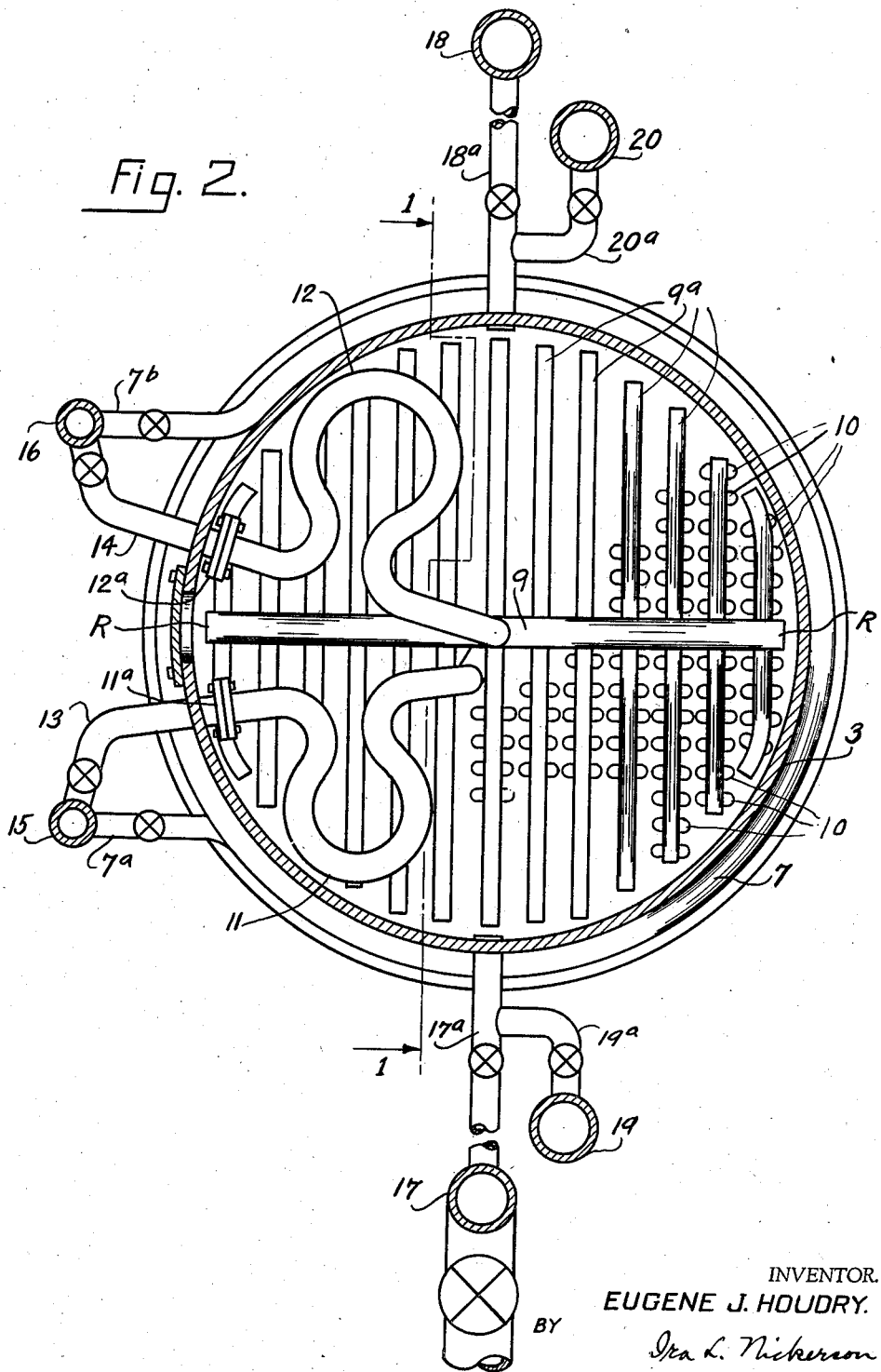

Patented Feb. 24, 1942

2,273,865

UNITED STATES PATENT OFFICE 2,273,865

APPARATUS FOR CATALYSIS AND THE USE THEREOF

Eugene J. Houdry, Ardmore, Pa., assignor to Houdry Process Corporation, Wilmington, Del., a corporation of Delaware Original application August 5, 1937, Serial No. 157,475. Divided and this application April 25, 1939, Serial No. 269,919

4 Claims. (Cl. 23—1)

This application is a division of my copending application Serial No. 157,475, filed August 5, 1937, under the title "Catalysis," which issued as Patent No. 2,161,677 on June 6, 1939.

The invention relates to chemical reactions effected through or in the presence of contact masses which promote, enter into or merely present an extended surface area for the reaction. It is especially concerned with the use of catalysts having selective adsorptive properties capable of directing the extent and character of a reaction, and with equipment adapted to produce high or maximum yields of desired products. While the invention relates generally to decomposition, conversion, metathesis, and synthesis of organic materials, it has special application to the treatment of hydrocarbons in natural or derived state such as natural gas, mineral oil, shale oil, carbonaceous material, distillates and derivates thereof and products therefrom.

One object of the invention is to utilize catalysts and contact masses under the best conditions or under conditions near to the best. Another object is to provide apparatus having flexibility of use and control for attaining superior results from the angles of yield and of economics. Other objects will be apparent from the detailed description which follows.

In operations involving the treatment and conversion of organic materials including hydrocarbons which produce contaminating deposits of a burnable nature upon the catalyst, study and experimentation over a long period have demonstrated that the essentials for an operation which is commercially feasible include (a) Control of the deposit on the catalyst and
(b) Good temperature control of the entire operation.

For high yields it is essential that (1) The quantity of reactants per pass be limited and that
(2) They be sent at proper velocity over the catalyst so as to produce a small amount of contaminating deposit.

For fast regenerations the essentials comprise (1) Small deposit of contaminating material
(2) Temperature control
(3) Regenerating medium under pressure
(4) Regenerating medium at proper rate and velocity.

The burnable deposit on the catalyst is kept to a minimum only when a restricted quantity of reactants is sent at proper rate and velocity through a bed of catalyst of sufficient depth to give a time of contact which effects maximum conversion to desired products with a minimum of side and secondary reactions.

Accurate temperature control which is requisite for best yields and for speedy regenerations can be effected with catalysts which are poor conductors of heat (for example silicious catalysts) when there is a heat conducting wall within an inch of every part of the catalytic mass. Such walls may impart heat to the mass during endothermic reactions and remove heat during exothermic reactions. When two such reactions take place successively with the exothermic reaction at a higher temperature than the endothermic reaction (as in the catalytic conversion of higher boiling hydrocarbons into lower boiling hydrocarbons followed by regeneration of the catalyst by oxidation), a substantially uniform temperature on such walls at or near the endothermic reaction, or intermediate the temperature of the two reactions, as from 800° to 950° F., is very satisfactory, or temperatures which vary with the reaction but are kept within the range of about 750° to 1000° F.

The quantity of reactants sent into the catalytic zone during an on-stream period should not exceed 100% (liquid measure) of the volume of the contact mass. For the highest yields the liquid volume of reactants will usually be somewhat less than 50% of the volume of the catalyst.

Heretofore difficulties in regeneration have dictated a shallow depth of bed or short paths of flow within a bed. With the herein disclosed arrangement of heat conducting surfaces near all parts of the contact mass and with efficient heat exchange media such as fused salts, molten metals and alloys, etc., heat can be removed from (or imparted to) all parts of the mass so quickly that good heat control of masses up to at least fifteen feet in depth is now entirely feasible, both for regenerations and for on-stream reactions, exothermic or endothermic, and widely variant in degree of thermal intensity. A long path of flow in many instances permits a higher charging rate for the on-stream reaction with greater throughput and better yield. The greater the depth, however, the more pressure is required on the charge with a tendency to impair somewhat the quality of the products; also the regenerating period is lengthened. Hence the economies in equipment and in cycle it is important to select a depth of catalyst as low as possible for the quantity of charge available and desired yield. Beyond a fifteen foot depth of catalyst the yield falls off. Depths within the range of two to ten feet are desirable with a preference to the range from two to six feet. There is little or nothing to be gained in yield in depths above six feet and regenerations are lengthy. A highly satisfactory cycle from all points of view can be worked out with a catalyst bed or path or flow of the order of two to four feet.

Proper velocity of the reactant material through the contact mass is very important in effecting a high yield of the desired products and in minimizing side and secondary reactions. The depth of bed or path of flow within the contact mass has an important bearing upon the charging rate to the catalytic chamber. In general, the charging rate should be such that the apparent velocity of reactants in inches per second within the mass (computed on empty space) will lie within the range of from one-sixth to three times the depth of bed or path of flow therein. Up to a depth of six feet the range can be extended somewhat at both ends as from one-eighth to four times. Beyond a depth of six feet up to and including fifteen feet, the range tends to be more restricted as from one-fifth to about two times the depth of bed. With an active catalyst and a path of movement of reactants of at least one foot and up to fifteen feet, a velocity of reactants of at least two-fifths of an inch per second should be maintained. It is usually preferable, however, to utilize a path of movement of at least one to two feet for treating and converting hydrocarbons and to limit the reaction period to not more than twenty minutes with a catalyst capable of converting at least 30% of the charge into the desired product or products, thereby insuring an operation at high efficiency. During regeneration, velocities of oxidizing media within the ranges indicated above will be utilized. Inasmuch as regenerating periods are unproductive, it is important to make them as short as possible. Hence rates of feed will be utilized giving maximum apparent velocities within the capacity of the heat exchange equipment to hold the catalytic mass at desired temperature or within safe limits. In most instances, it is possible to free the mass of contaminating deposits within a period equal to that of the on-stream operation, but the purging steps preliminary to and following the oxidizing operation as well as the cooling down period to restore the mass to on-stream temperature usually cause regeneration to consume up to about twice the time of the on-stream operation. Under such circumstances, three converters are required for continuous operation of the process, giving one converter on-stream while the other two are in regeneration, but it is possible to operate continuously with two converters if a high rate of feed is employed for regenerating reactants and a correspondingly lower rate and consequently smaller quantity of reactants are fed during the on-stream period.

While the oxidizing or regenerating reaction can be effected with air at atmospheric temperature and pressure, it is speeded up by heating the air or other medium and sending it through the converter under pressures above atmospheric. Temperatures of from 500° to 900° F. are suitable, with a preferential range of from 700° to 900° F., and pressures up to 200 lbs./sq. in. may be employed. Heat or energy or both may be recovered from the spent regenerating medium as indicated for example in the copending application of myself and R. S. Vose, Serial No. 58,858, filed January 13, 1936 (Patent No. 2,167,655, issued Aug. 1, 1939).

Methods for determining the best operating conditions for various reactions, catalysts, types of charging stocks and the like are set forth in my aforesaid copending application Serial No. 157,475, from which the present application has been divided. One concrete form of apparatus having a considerable degree of flexibility as to choice of length of path in the catalytic zone and otherwise desirable for use in effecting catalytic reactions is shown in the accompanying drawings in which:

Fig. 1 is a side elevational view partly in vertical section at its lower end, as on the line 1—1 of Fig. 2, and partly broken away thereabove to indicate the internal construction; and Fig. 2 is an enlarged transverse sectional view substantially on the line 2—2 of Fig. 1, indication of certain parts of the contact mass and of the radiator element being omitted for the sake of clearness.

In the drawings, only a contact treating case or converter is illustrated, together with the lines for fluid necessary for its operation. All auxiliary apparatus such as heaters or stills, heat exchangers, fractionators, condensers, etc., have been omitted as well as many of the detachable joints, expansion bends, etc. required in a commercial unit, since they are not necessary to an understanding of the invention. The converter illustrated is sectional in character and adapted to be erected conveniently in any desired size. As shown, it comprises a plurality of open ended members 3 of annular or cylindrical or any other desired shape. These members may be flanged at their opposite ends or otherwise arranged for convenient attachment to one another. In the drawing, six such sections 3 are shown mounted in superposition, the lowest section resting upon and being secured to a hollow closure member 4, while the top section has a cover or closure plate 5 secured thereto. Each section member 3 is provided on its interior and at its lower end with a perforated partition or grid member 6 which supports mass M, of contact or catalytic material, capable of effecting the desired transformation, conversion or treatment of the reactants fed thereto. The temperature of each mass M is controlled by heat exchange means, such as heat conductor or radiator member R resting upon grid 6 and embedded in the mass M. Additional heat control of each mass M is effected by temperature regulation of at least a part of the wall of each of sections 3. By preference, such part includes all portions of the walls of the sections which are in contact on their inner faces with mass M. A convenient way of regulating the temperature of the aforesaid parts of the walls of the sections 3 is to surround the same with pipe coil 7 through which the same or a different heat exchange fluid is circulated as for heat conductors or radiators R. With such an arrangement and with a suitable design of interior heat conductor or radiator member R, it will be apparent that every part of each contact mass can be at any desired distance from a heat conducting wall, which wall may be the enclosing wall of section 3, controlled by a coil 7, or a part of a heat conductor or radiator R, finned or otherwise.

The type of heat conductor or radiator R, shown by way of illustration in Figs. 1 and 2, comprises a lower header 8 and an upper header 9, with transverse members 8a and 9a disposed in pairs in superposed relation and interconnected by a plurality of parallel vertically disposed conduits 10, members 8a, 9a and conduits 10 being preferably flattened or oval shaped to present a maximum of heat conducting and radiating surface. Supply lines 11 and 12 for lower and upper headers 8 and 9, respectively, extend above mass M in each of sections 3 and are detachably connected as at 11a and 12a to valved branches 13 and 14, respectively, which extend through the walls of sections 3 from supply line 15 and vent line 16 for the heat exchange fluid. Supply line 15 also has valved connections 7a to coils 7 which, in turn, have valved connections 7b to vent line 16.

Provision is made for supplying reactants either above or below each of contact masses M by valved branch lines 17a from supply line 17, and for withdrawing reaction products from below or above each of contact masses M by valved connections 18a from vent line 18. If the reaction is such as to produce a contaminating deposit upon catalytic masses M and if this deposit must be removed from time to time in order for the desired reaction to continue, then there will be a supply line 19 (Fig. 2) for cleansing or regenerating media, the valved branches 19a from which may join the branches 17a for reactants. Similarly, there will be a withdrawal line for the fumes or products of the regenerating reaction, such as line 20, having valved connections 20a joining valved connections 18a from reaction products line 18. As will be clear from Fig. 1, the lowermost branched connections such as 17a and 19a and 18a and 20a will connect with the shallow chamber in supporting closure member 4. In all other instances, the connections are made into the space above the contact mass M in each of sectional members 3, thus facilitating the assembly of the converter which is effected section by section from bottom to top. To permit inspection of the chambers above the contact masses, and especially to check the condition of joints 11a and 12a in the connections to radiators R, one or more openings are provided in the walls of each of sections 3, which openings may be sealed by bolted cover plates 21.

A sectional container of the type herein disclosed has a great variety of uses and is directly applicable to all operations requiring the use of any sort of contact material, whether it is mere inert spreading material, whether it is porous and only absorbent in character, or whether it presents a low or high degree of adsorptive power or catalytic activity. Likewise, the heat exchange fluid supplied by line 15 to coil 7 and/or radiator members R may be of any type which is fluid at the temperatures of operation. Hence the heat exchange medium may be gaseous, liquid or solid at atmospheric temperature. Some media which are gaseous, such as nitrogen or even air, are sufficient to control mild reactions, either endothermic or exothermic, which may be effected within the sectional container. When a more efficient medium is required, materials which change state, such as water, mercury, diphenyl, etc. may be utilized. For moderately high temperature operations in which change of state is not desired, high boiling materials, such as fused salts, metals and metallic alloys, may be utilized.

For the conversion and treatment of hydrocarbons, as in the production of low boiling hydrocarbons of high quality from high boiling hydrocarbons, to which the present invention is especially but not exclusively directed, the contact masses M may be made up of bits, fragments, or molded pieces of silicious material, such, for example, as active blends of silica and alumina of natural or artificial origin, with or without the addition of other active components, such as certain metals in finely divided form, including those of nickel, copper, cobalt, manganese, etc. as disclosed and claimed, for example, in my U. S. Patents Nos. 2,078,945 and 2,078,951 issued May 4, 1937. A good size and shape for such material is .2 mm. to 4 mm. molded plugs or pieces. Since such material is a relatively poor conductor of heat, efficient heat conductors or radiator members R will be required of the general type indicated in Figs. 1 and 2 and of such form as to dispose heat conducting surfaces within about ½" of every part of mass M, and at no point more than 1" from each such part. The heat exchange medium, which is by preference a molten metal or alloy or fused salts, will be circulated at a high rate through both the heat conductors or radiators R and the coil 7 at suitable temperature to control the reaction by supplying heat to or removing heat from the contact mass, for example, by maintaining wall temperatures in the range of 750° to 1000° F. (preferably 800° to 950° F.) throughout the sectional converter or at least those portions of the latter which are in direct contact with the catalytic mass M. This is a good temperature range for controlling an endothermic transforming reaction to produce gasoline taking place in the range of 775° to 900° F. and the alternate exothermic regenerating reaction at somewhat higher temperature but usually not in excess of 1100° F.

A converter of the type shown in the drawings permits a considerable choice in the length of path of reactants through the contact mass or masses without requiring anything more than the manipulation of valves. For example, admitting reactants at top or bottom and venting reaction products from the opposite end in a straight-through operation gives a length of path of 6 feet, if each of masses M is one foot deep, or of 12 feet, if each of the masses is two feet deep. Admitting reactants at the center of the converter and venting products at both ends, or sending the reactants in at both ends and venting at the center, would give paths of 3 or 6 feet depending upon whether the individual masses are one foot or two feet in depth. It is further apparent that a six section converter can be operated with depths of bed of one foot or two feet (if each section has a mass of one foot depth) or of two or four feet (when the individual masses M are two feet in depth). Other combinations are readily arranged as may be desired or required by the type of reaction and character of the contact mass. Regeneration may be effected with the same or a different depth of bed as compared with the on-stream reaction. When regeneration is by oxidation wherein the burning progresses in the form of a wave, it is preferable to effect the regeneration simultaneously in each of masses M so as to take advantage of the lowest depth of bed and thus speed up this unproductive reaction as much as possible.

I claim as my invention:

1. In the use of a converter made up of a series of individual sections, each section containing a mass of catalytic material and having a heat exchange member embedded in said mass and disposing a heat exchange surface within an inch of all parts of said mass, the process of effecting different reactions in alternation in said converter under different operating conditions, providing the proper time of contact for each reaction by sending reactants through said sections in parallel when a relatively small depth of catalytic material is required and through said sections in series parallel when a greater depth of catalyst is required, and adjusting and controlling the temperature of the catalytic material by the temperature of the extraneous heat exchange medium supplied to the individual heat exchange members of said sections.

2. Apparatus for catalysis and contact treatment of fluids comprising a converter made up of a plurality of distinct and similar sections, each section having means for supporting therein a mass of solid contact material and having means for controlling the temperature of said mass including heat conducting surfaces embedded in said mass within at least an inch of all parts of said mass, said converter having connections for controlling the admission to and venting of fluids from both sides of each of said masses thereby to permit movement of fluid through said masses in any desired combination.

3. Apparatus for catalysis and contact treatment of fluids comprising a converter made up of a plurality of distinct and similar sections, each section having a grid therein supporting a mass of solid contact material, temperature controlling means on each section including heat conducting surfaces embedded in each said contact mass within at least an inch of every part of each such contact mass, an inlet connection for admitting reactants and an outlet connection for venting reaction products at the upper end of each of said sections, and a closure member for the lowermost section providing a chamber with connections thereto for admitting reactants and for venting reaction products whereby such connections are provided on both sides of each contact mass and reactants may be sent as may be desired in either direction through one, several, or all of said masses singly or in series.

4. Apparatus for catalysis and contact treatment of fluids comprising a container made up of demountable open ended sections of similar size and shape secured together in superposed relation, closure members for the uppermost and lowermost members, perforated supports at the lower ends of said sections, masses of solid contact material resting on said supports, radiators embedded in said masses and extending to all parts thereof, heat exchange coils surrounding the exterior of said sections within projections of said masses, connections for reactants and reaction products to said sections above the contact masses therein and to said bottom closure member to permit full choice of length of path through said masses for reactants and for flow in either direction, and means for circulating at desired temperature through said radiators and said coils extraneous heat exchange media effectively to regulate and control the temperature of said contact masses.

EUGENE J. HOUDRY.